L. J. B. SCHNUG.
WATER STILL.
APPLICATION FILED APR. 30, 1920.

1,429,541.

Patented Sept. 19, 1922.

INVENTOR.
LOUIS J. B. SCHNUG
BY A. B. Bowman
ATTORNEY.

Patented Sept. 19, 1922.

1,429,541

UNITED STATES PATENT OFFICE.

LOUIS J. B. SCHNUG, OF SAN DIEGO, CALIFORNIA.

WATER STILL.

Application filed April 30, 1920. Serial No. 377,803.

*To all whom it may concern:*

Be it known that I, LOUIS J. B. SCHNUG, a citizen of the United States, residing at San Diego, in the county of San Diego and State of California, have invented certain new and useful Improvements in Water Stills, of which the following is a specification.

My invention relates to a still for use in connection with a teakettle for gathering the steam in the form of condensed water for drinking water and other uses and the objects of my invention are: First, to provide a new and novelly constructed still for distilling liquid; second, to provide a still of this class which is applicable for use for household purposes; third, to provide a still of this class which may be used in connection with a teakettle or other vessel so that when heating water for other purpose, water may be distilled at the same time; fourth, to provide a still of this class which is very simple, economical of construction, durable, easy to operate, easy to install for use and which will not readily deteriorate or get out of order.

Figure 1:
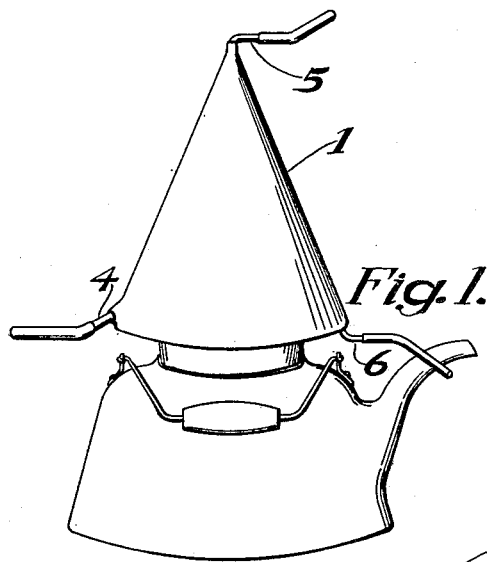
Figure 2:
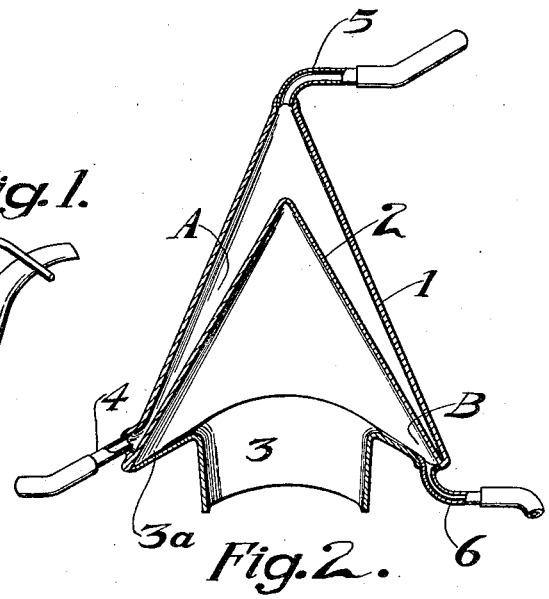

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a perspective view of my still shown mounted on a teakettle ready for use; Fig. 2 is a sectional view thereof through the middle and showing some of the portions in elevation and Fig. 3 is a perspective view of the same in a slightly modified form from that of Figs. 1 and 2 and showing a portion broken away and in section to facilitate the illustration.

The outer casing 1, inner casing 2, vessel engaging member 3, tube 4, tube 5, and tube 6 constitute the principal parts and portions of my still in its preferred form.

The outer casing 1 is preferably a conical shaped casing and communicating with its apex is a tube 5 which serves as a conductor. Mounted inside of this casing 1 is another conical shaped casing 2 secured thereto at its base edge and with its walls spaced slightly from this outer casing and forming a chamber A between said casing with upwardly diverging walls. Communicating with this chamber A at the lower side is a tube 4 which serves as a conducting tube. Secured to the lower edge of these members 1 and 2 and forming a tight joint is the outwardly and downwardly extending annular flange 3ª of the vessel engaging member 3 and from this flange 3ª extending downwardly and tapering slightly is the vessel engaging member portion 3 which is of suitable size to fit into the hole of the teakettle when the cover is removed and is tapered so that it rests in said hole with a portion extending slightly into the teakettle all as shown best in Fig. 1 of the drawings. This flange member 3ª in connection with the member 2 forms a trough B and communicating with this trough B is a tube 6 which forms a conductor for liquid from the trough B.

Figure 3:
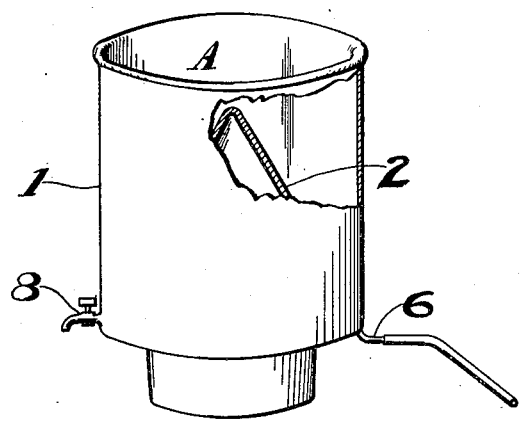

In the modified form of construction shown in Fig. 3 of the drawings the outer casing 1 instead of being conical shaped is cylindrical in form and it is open at the top. The tube 5 being dispensed with and instead of the tube 4 there is provided a faucet 8 which serves to drain the chamber A.

Though I have shown and described a particular construction, combination and arrangement of parts and portions and a certain modification thereof I do not wish to be limited to this particular construction, combination and arrangement, nor to the modification thereof as disclosed but desire to include in the purview of my invention the construction, combination and arrangement substantially as set forth in the appended claims.

The operation of my still is as follows:

The still is placed in position on a teakettle or other vessel over a fire for heating water for general utility purposes. The tubes 4 and 5 are connected up with a hose with the water circulating pipe and to drainage so that there is circulation of cold water in the chamber A. The steam from the teakettle or vessel condenses on the inner surface of the casing 2 by reason of its being cold by conduction from the cold water in the chamber A and runs down along the inner surface of the casing 2 into the trough B and out through the tube 6 into a supply vessel. In the modified form shown in Fig. 3 water is poured into the chamber A by any method desired and drained off through the faucet 8 as desired, the other portion of the still being the same.

Having thus described my invention what I claim as new and desire to secure by Letters Patent is:

1. A water still, including a conventional tea kettle, a conical-shaped casing member, a frusto-conical member with its outer edge secured to the outer edge of said conical casing member and provided with an extended downwardly and inwardly tapering flange portion adapted to fit snugly the filling opening of said tea kettle, and a larger conical-shaped outer casing with its lower edge secured to the lower edge of said conical-shaped casing member and extending upwardly, forming a cold water receptacle.

2. A water still, including a conventional tea kettle, a conical-shaped casing, a flange member secured to the outer edge of said casing and extending upwardly and inwardly forming an annular trough inside of said casing and provided with a downwardly extending tapering flange portion fitting snugly the filling opening of said tea kettle, means communicating with said trough portion for conducting liquid therefrom and another larger conical-shaped casing secured to the outer lower side of said conical-shaped casing forming a cold water receptacle with the outer surface of said conical-shaped casing and provided with an inlet opening in the apex of said larger conical-shaped casing.

In testimony whereof, I have hereunto set my hand at San Diego, California, this 23 day of April, 1920.

LOUIS J. B. SCHNUG.